(12) United States Patent
Thubert et al.

(10) Patent No.: US 7,519,733 B1
(45) Date of Patent: Apr. 14, 2009

(54) ARRANGEMENT IN A ROUTER FOR ESTABLISHING MULTICAST GROUP HIERARCHY AND COALESCENCE

(75) Inventors: Pascal Thubert, La Colle sur Loup (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 959 days.

(21) Appl. No.: 10/844,361

(22) Filed: May 13, 2004

(51) Int. Cl.
*G06F 15/173* (2006.01)
(52) U.S. Cl. .............. 709/238; 709/232; 709/239; 709/240; 709/242; 709/244; 709/245
(58) Field of Classification Search ......... 709/232, 709/238–240, 242, 244, 245
See application file for complete search history.

(56) References Cited

U.S. PATENT DOCUMENTS

| | | | |
|---|---|---|---|
| 6,055,364 A | 4/2000 | Speakman et al. | |
| 6,061,679 A * | 5/2000 | Bournas et al. | 707/3 |
| 6,389,475 B1 | 5/2002 | Speakman et al. | |
| 6,396,842 B1 * | 5/2002 | Rochberger | 370/408 |
| 6,778,532 B1 * | 8/2004 | Akahane et al. | 370/392 |
| 6,917,618 B2 | 7/2005 | Thubert et al. | |
| 6,931,248 B2 * | 8/2005 | Borel | 455/431 |
| 6,980,555 B2 * | 12/2005 | Mar | 370/395.21 |
| 7,257,628 B2 * | 8/2007 | Liskov et al. | 709/223 |
| 7,325,071 B2 * | 1/2008 | Krishnan | 709/238 |
| 7,373,394 B1 * | 5/2008 | Li et al. | 709/219 |
| 2003/0225907 A1 * | 12/2003 | Krishnan | 709/238 |
| 2004/0032852 A1 | 2/2004 | Thubert et al. | |
| 2004/0057440 A1 | 3/2004 | Thubert et al. | |
| 2004/0081152 A1 | 4/2004 | Thubert et al. | |

OTHER PUBLICATIONS

Kumar, "Distributed hierarchy construction for large dynamic networks", PhD Dissertation Proposal, pp. 1-61, Publication date unknown.

* cited by examiner

*Primary Examiner*—Liangche A Wang
(74) *Attorney, Agent, or Firm*—Leon R. Turkevich (57) ABSTRACT

Routers of a content network include routing entries that specify aggregation levels, enabling the routers to establish a tree-based topology within an aggregation realm for distribution of broadcast packets. Each router is configured to have a prescribed aggregation level within the aggregation realm, and identify a network-directed broadcast packet based on detecting a prescribed pluricast code at a corresponding prescribed prefix location relative to the prescribed aggregation level. Each router also is configured for storing a registration request within its routing entries, and propagating the registration request to other routers within the aggregation realm. Each registration request includes a bit mask according to one of the prescribed aggregation levels. Hence, client-based registration requests can be propagated throughout the aggregation realm for rules-based coalescence of subscriber groups throughout the aggregation realm.

28 Claims, 6 Drawing Sheets

Request: news.world.europe.france.nice.me
Req. Mask:

| S: match with Source mask R: match with Req. mask | S AND R | S OR R | R only | S only | S XOR R | S AND ~R | R AND ~S |
|---|---|---|---|---|---|---|---|
| news.world::0 / 140a, 142a | N | Y | N | Y | Y | Y | N |
| news.world.europe::0 / 140b, 142b | N | Y | N | Y | Y | Y | N |
| news.world.us::0 / 140c, 142c | N | N | N | N | N | N | N |
| news.world.europe.france::0 / 140d, 142d | Y | Y | Y | Y | N | N | N |
| news.world.europe.uk::0 / 140e, 142e | N | N | N | N | N | N | N |
| news.world.europe.france.nice::0 / 140f, 142f | Y | Y | Y | Y | N | N | N |
| news.world.europe.france.lyon::0 / 140g, 142g | N | Y | Y | N | Y | N | Y |

Figure 6

ARRANGEMENT IN A ROUTER FOR ESTABLISHING MULTICAST GROUP HIERARCHY AND COALESCENCE

BACKGROUND OF THE INVENTION

1. Field of the Invention

The present invention relates to multicasting and video distribution techniques by content networks configured for providing broadcast-type data via Internet Protocol (IP) based routers.

2. Description of the Related Art

Multicasting enables a broadcast source to broadcast IP-based packets carrying media information (e.g., audio, video, etc.) to multiple destinations such as client computers. In particular, server-based multicasting has required a media server to respond to a client having requested the media stream by initiating a corresponding media stream for the client. Such client-server based multicasting limits the capacity of the multicasting to a limited number of client requests.

IP-based multicasting, however, contemplates that the broadcast source can save bandwidth and central processing unit (CPU) resources by outputting a single broadcast stream to IP-based routers within a network: the IP-based routers copy the broadcast stream on multiple downstream (i.e., ingress) interfaces, enabling wide distribution of the broadcast stream in a scalable manner. Both IPv4 and IPv6 specify multicast addresses in terms of group identifiers, although their use is limited to identification of a reception group.

One limited form of broadcasting within a subnetwork (i.e., subnet) is network-directed broadcast. In particular, host computers in a local area network typically are configured with an IP address, and include a subnet mask that is used to specify the range of IP addresses within a given subnetwork. For example, a host computer having an IP address "123.156.176.234" having a subnet mask of "255.255.255.000" will belong to the subnet "123.156.176". Hence, all host computers having the IP address prefix "123.156.176" belong to the same subnet.

Consequently, a router can broadcast a packet within its subnetwork using a network-directed broadcast packet. In particular, if a router wants to ping all the host computers on the subnet, if the subnet mask is a 24-bit mask (e.g., 255.255.255.0), the router can ping all the devices automatically by generating a prescribed multicast address based on the subnet prefix ("123.156.176/18") masked by the subnet mask ("255.255.255.0"), resulting in the multicast address "123.156.176.000". (Note that the addresses "0" and "255" on a given subnet are reserved for broadcast).

Since the multicast address (e.g., "123.156.176.000") is a globally valid IP address, any router in the Internet that receives the packet specifying the multicast address ("123.156.176.000") will be able to route the packet to the destination router serving the subnet "123.156.176/18" (i.e., the destination router). In response to the destination router detecting the packet specifying the multicast address ("123.156.176.000") within its corresponding destination address field, the destination router will detect the address suffix "000" as corresponding to a network-directed broadcast packet and not a host-specific unicast packet; hence, the destination router will respond to the broadcast address suffix "000" by broadcasting the packet on all its downstream (i.e., ingress) ports, typically using a layer 2 (IEEE 802.1/Ethernet) based multicast address.

As apparent from the foregoing, the network-directed broadcast is limited to broadcast operations in the destination router serving the specified subnet. Hence, any network-directed broadcast capabilities are limited to the members of the subnet. Consequently, broadcast capabilities for a given host computer are limited by the network topology, limiting flexibility in distribution of broadcast information to different destinations.

SUMMARY OF THE INVENTION

There is a need for an arrangement that enables users to register with multiple multicast groups that enable inheritance of broadcast streams based on hierarchical attributes of the multicast groups.

There also is a need for an arrangement that enables network-directed broadcasts to be distributed among multiple routers based on based on distribution of registration information between the routers according to a prescribed hierarchy based on aggregation of address realms by the routers.

There also is a need for an arrangement that enables a subscriber, having executed an initial registration to a prescribed subscription group, to enjoy automatic subscription to relevant subscription groups, even if the subscriber is not aware of the relevant subscription groups.

These and other needs are attained by the present invention, where routers of a content network include routing entries that specify aggregation levels, enabling the routers to establish a tree-based topology within an aggregation realm for distribution of broadcast packets. Each router is configured to have a prescribed aggregation level within the aggregation realm, and identify a network-directed broadcast packet based on detecting a prescribed pluricast code at a corresponding prescribed prefix location relative to the prescribed aggregation level. Each router also is configured for storing a registration request within its routing entries, and propagating the registration request to other routers within the aggregation realm. Each registration request includes a bit mask according to one of the prescribed aggregation levels. Hence, client-based registration requests can be propagated throughout the aggregation realm for rules-based coalescence of subscriber groups throughout the aggregation realm.

One aspect of the present invention provides a method in a router. The method includes storing a first routing table entry that specifies an address prefix corresponding to an aggregation level of the router relative to a tree-based topology within an aggregation realm of a content network, the address prefix having a prescribed prefix length. The method also includes receiving a packet from a parent router via an egress interface of the router. The method also includes determining whether a destination address field of the packet has a destination address that specifies a prescribed pluricasting code at a prescribed location relative to the prescribed prefix length. The method also includes selectively pluricasting the packet to a plurality of destination routers, via respective ingress interfaces, based on determining that the destination address field specifies the prescribed pluricasting code at the prescribed location.

Another aspect of the present invention provides a router. The router includes a routing table, an egress interface, a routing resource, and a plurality of ingress interfaces. The routing table is configured for storing a first routing table entry, the first routing table entry specifying an address prefix corresponding to an aggregation level of the router relative to a tree-based topology within an aggregation realm of a content network. The address prefix has a prescribed prefix length. The egress interface is configured for receiving a packet from a parent router. The routing resource is configured for determining whether a destination address field of the packet has a destination address that specifies a prescribed pluricasting code at a prescribed location relative to the prescribed prefix length. The routing resource also is configured for selectively pluricasting the packet to destination routers based on determining that the destination address field specifies the prescribed pluricasting code at the prescribed location. The ingress interfaces are configured for supplying to the respective destination routers the packet having been pluricast by the routing resource.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
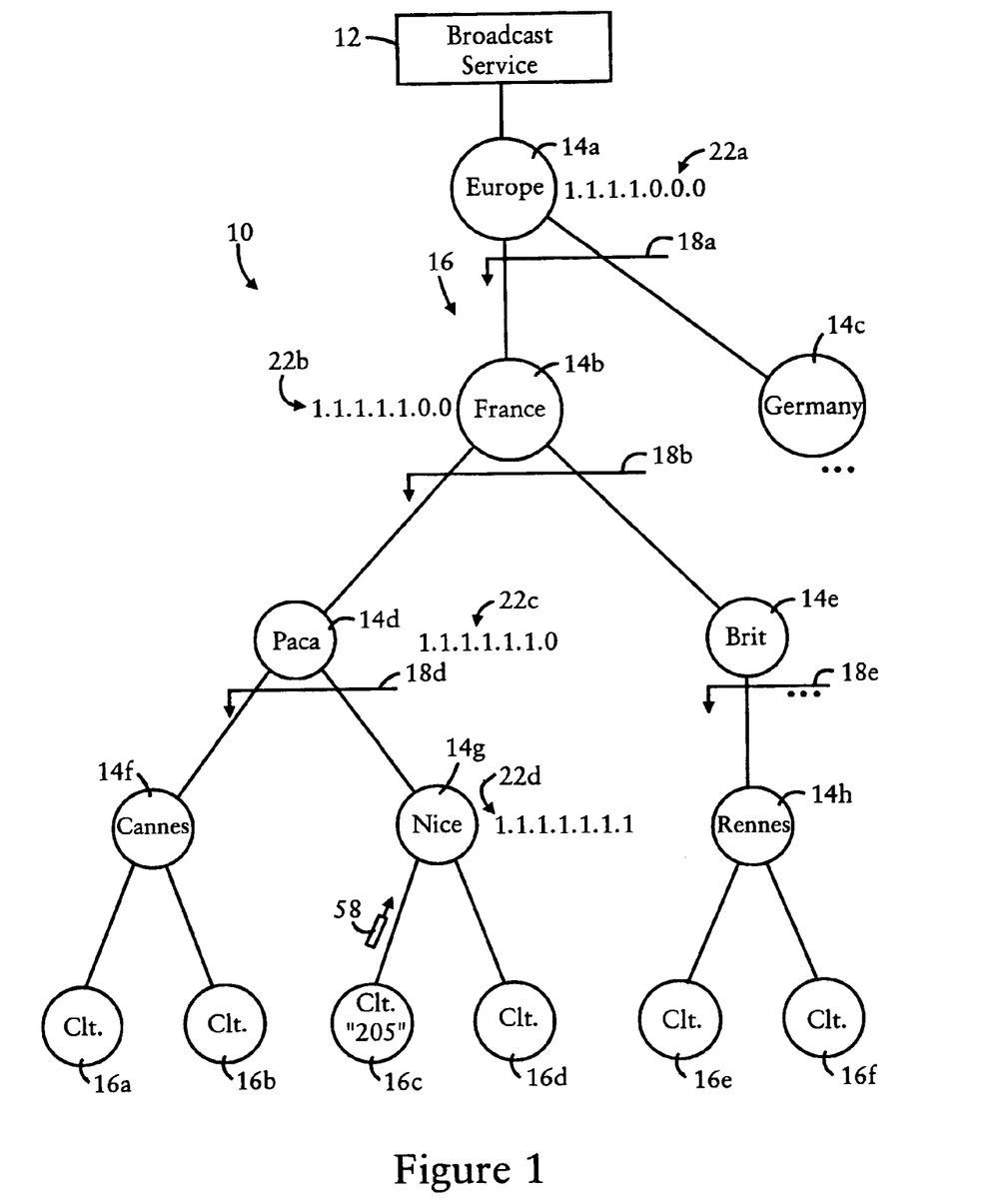
FIG. 1 is a diagram illustrating a content network having routers configured for rules-based pluricasting of packets, according to an embodiment of the present invention.

FIG. 1 is a diagram illustrating a content network 10 having a broadcast source 12 and routers 14 configured for distributing packets for reception by destination clients 16, according to an embodiment of the present invention. Each of the routers 14 are arranged according to a tree-based topology within an aggregation realm 18, illustrated in FIG. 1 as a Geodetic (i.e., geographic-based) addressing scheme. As described below, the "addresses" refer to identifiers for content, as opposed to network addresses of client devices.

As illustrated in FIG. 1, the top-level router 14a distributes packets within a prescribed aggregation realm 18a having a continent-based aggregation level (e.g., "Europe"). The routers 14b and 14c are child routers to the top-level router 14a, each router 14b and 14c having a country-based aggregation level ("France" for router 14b and "Germany" for router 14c). In other words, the router 14a is a parent router to the routers 14b and 14c, and the routers 14b and 14c have the country-based aggregation realms of France and Germany, respectively.

The routers 14d and 14e are child routers to the router 14b ("France"). The routers 14d and 14e each have a county-based (i.e., region-based) aggregation realm of "Paca" and "Brit", respectively. The routers 14f, 14g, and 14h each have a city-based aggregation realm of "Cannes", "Nice", and "Rennes", respectively.

Figure 4:
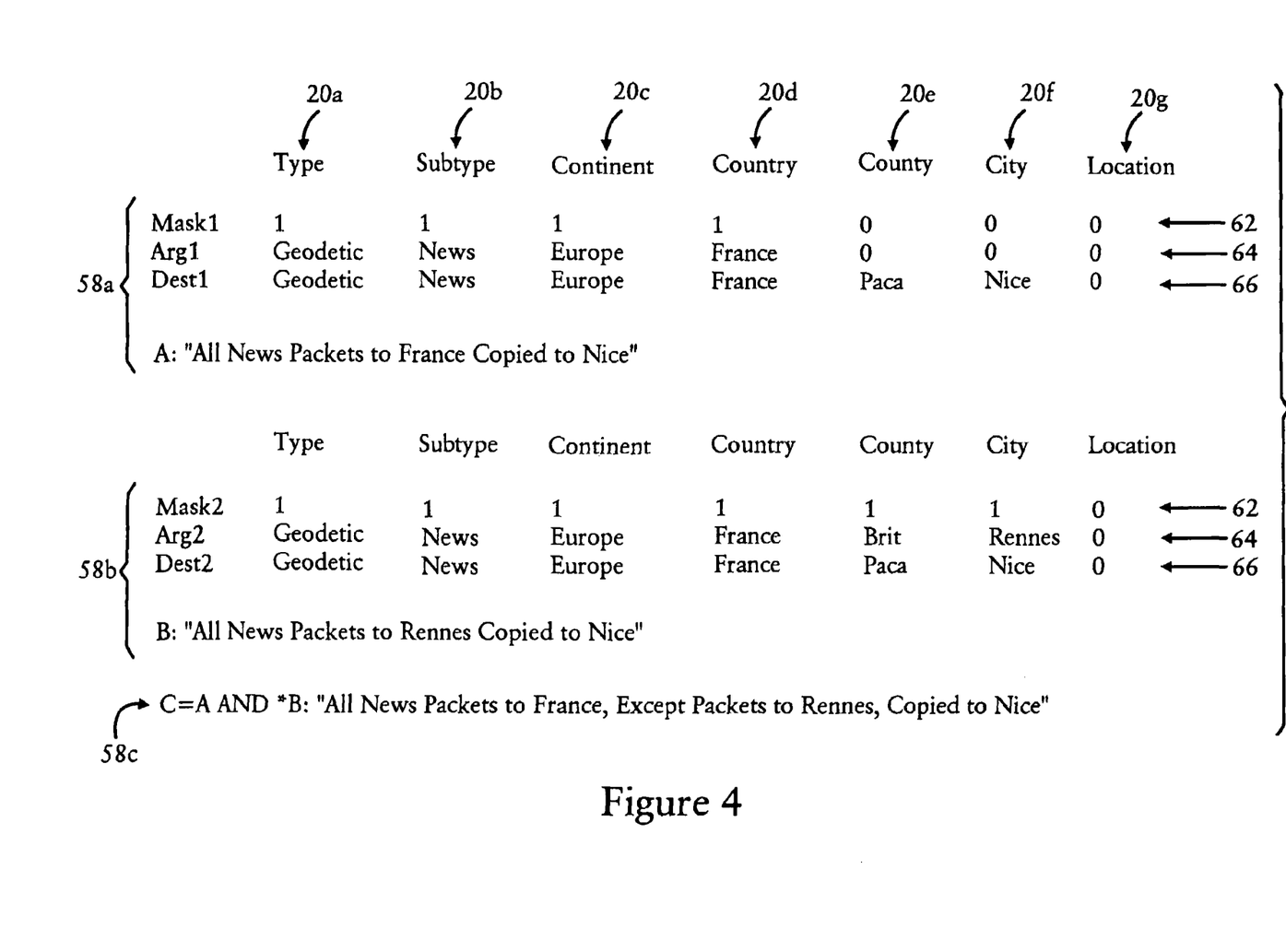
FIG. 4 is a diagram illustrating in further detail client-initiated registration information for rules-based registration to a pluricast group.

Hence, the addressing scheme used by client nodes 16 for obtaining desired content can be based on the following hierarchy, illustrated in FIG. 4:

Type/Subtype/Continent/Country/County/City/Location where the aggregation level "Type" 20a (T bits) refers to a Geodetic address type; the aggregation level "Subtype" 20b (M bits) refers to broadcast type (e.g., news service); the aggregation level "Continent" 20c (C bits) refers to an addressed continent (e.g., "Europe"), the aggregation level "Country" 20d (P bits) refers to the addressed country (e.g., "France"), the aggregation level "County" 20e (R bits) refers to the addressed county (e.g., "Paca"), the aggregation level "City" 20f (V bits) refers to the addressed city (e.g., Nice), and the aggregation level "location" 20g (L bits) refers to the local addressing architecture implemented by the City-based router (e.g., 14g) to provide a unique address to a client 16 for client-specific content. Hence, a specified address for identifying content for a client 16 will be composed of the sum of T+M+C+P+R+V+L bits.

Although a Geodetic addressing scheme is disclosed herein for purposes of illustration, it will be appreciated that an aggregated network topology based on numeric-based address prefixes typically can be used for implementation, for example if an implied mapping exists between aggregated content and the numeric-based addresses; in the example of IPv4 addressing, the router 14a could encompass an address realm based on an 8-bit address prefix, the routers 14b and 14c could encompass respective address realms based on respective 16-bit address prefixes within the address realm of the router 14a, and the routers 14f, 14g, and 14h could encompass respective address realms based on respective 24-bit address prefixes within the address realms of their respective parent routers. However, a necessary feature is that the routers are arranged according to a tree-based topology that enables each router 14 to serve as an aggregating router for a prescribed address realm. An IPv6 based addressing scheme can be implemented as well in accordance with the disclosed embodiment.

According to the disclosed embodiment, each router (e.g., 14a) includes a routing entry that specifies a mask (e.g., 22a) for identification of the corresponding aggregation level (e.g., 20c). As described below, each router is configured for identifying whether a given packet should be pluricast based on identifying a prescribed pluricast code for the prescribed aggregation level (e.g., contiguously following the address prefix for the aggregation realm served by the corresponding router). In the case of the router 14a serving the address realm "Geodetic.News.Europe", will be assigned the mask 22a having the value of "1.1.1.1.0.0.0"; hence, a packet having a destination address "Geodetic.News.Europe.0.0.0.0" can be masked by the mask 22a to identify a masked value of "Geodetic.News.Europe.0.*.*.*", where the symbol "*" refers to a "don't care". The router 14a will recognize the zero value contiguously following the address prefix "Geodetic.News.Europe" of its address realm as a prescribed pluricast code. Hence, the router 14a can automatically pluricast the packet to all child routers 14b, 14c, etc. via its egress interfaces.

Each child router also has a corresponding mask based on its aggregation level that enables the router to identify whether a received packet should be pluricast. Hence, the country-based routers 14b and 14c include a routing entry that specifies a mask 22b for identification of the corresponding aggregation level 20d; the county-based routers 14d and 14e each will include a routing entry that specifies a mask 22c for identification of the corresponding aggregation level 20e; and the city-based routers 14f, 14g, and 14h each will include a routing entry that specifies a mask 22d for identification of the corresponding aggregation level 20f.

Hence, the broadcast source 12 can output a single packet having a destination address "Geodetic.News-.Europe.0.0.0.0", and the routers on each aggregation level 20c, 20d, 20e, 20f, will pluricast the packet, enabling the packet to be broadcast throughout the content network 10 in a scalable manner.

In addition, each client 16 may perform registration requests to the content network 10 in order to modify the content that is actually received. In particular, each client 16 can register for broadcast packets based on outputting a registration request that specifies a destination address (e.g., a client subscription address or a destination subnet prefix), a bit mask, an argument specifying parameters to supply for the bit mask, and logical controls that specify the operation to be performed in the case of a match between the masked argument and a masked destination address for a given packet. The registration request is propagated throughout the content network 10 as needed by the routers 14, enabling client-initiated, rules-based pluricasting to be implemented in the routers. Moreover, the propagation of the registration request by the routers 14 enable the registration request to be coalesced based on the network hierarchy, optimizing implementation of pluricasting multicasting decisions in root nodes that serve as branch points for traffic flows.

Figure 2:
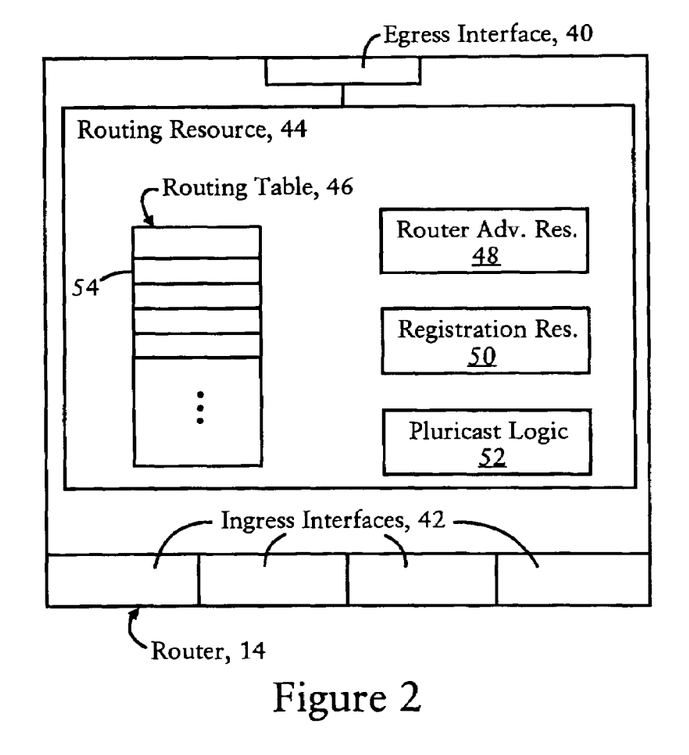
FIG. 2 is a block diagram illustrating one of the routers of FIG. 1, according to an embodiment of the present invention.

FIG. 2 is a diagram illustrating a router 14, according to an embodiment of the present invention. The router 14 includes an egress interface 40 configured for sending and receiving packets to an upstream router, also referred to as a parent router; for example, the router 14b of FIG. 1 uses its egress interface 40 to send and receive packets to and from its parent router 14a. The router 14 of FIG. 2 also includes a plurality of ingress interfaces 42. Each ingress interface 42 is configured for sending and receiving packets to and from a corresponding child router; for example, the router 14b of FIG. 1 sends and receive packets to and from the child routers 14d and 14e via respective ingress interfaces 42.

The router 14 also includes a routing resource 44 that includes a routing table 46, a router advertisement resource 48, a registration resource 50, and pluricast logic 52. The router advertisement resource 48 is configured for adding routing table entries 54 that specify address prefixes that are reachable via a corresponding interface 40 or 42 in response to detecting router advertisement messages from neighboring routers. In addition, the router advertisement resource 48 is configured for identifying the aggregation level 20 of the router 14 relative to the tree-based topology within the aggregation realm of the content network 10. Hence, the router advertisement resource 48 is able to determine the corresponding aggregation level of the router based on detected advertisement messages.

Figure 3:
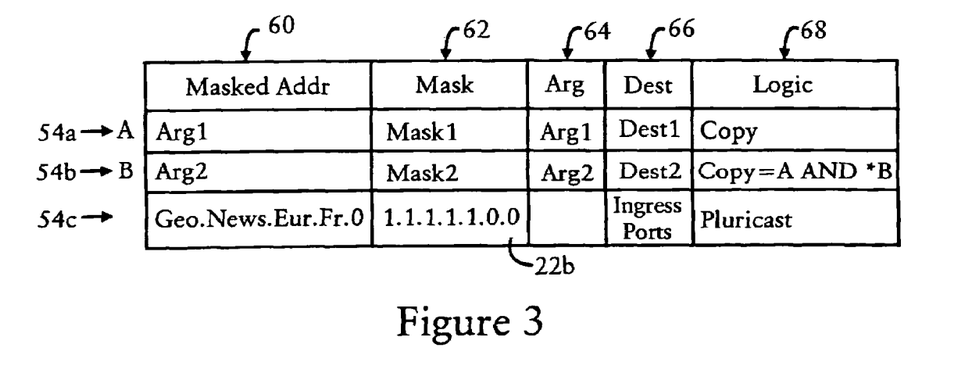
FIG. 3 is a diagram illustrating the table entries of FIG. 2.

The registration resource 50 is configured for receiving a registration request 58 from a client, and storing the contents of the registration request into a routing table entry 54. As illustrated in FIG. 3, the registration resource 50 generates a table entry 54 that includes a masked address 60, a mask 62, an argument 64, a destination 66, and logical controls 68. In particular, the registration request 58 includes a mask 62, the argument 64, the destination 66, and the logical controls 68. The destination 66 represents the intended destination of the packet to be forwarded, for example the destination content identifier associated with a client IP address. The argument 64 represents the parameters to be used in identifying a packet to be forwarded to the requesting client, described below with respect to FIG. 4. The mask 62 specifies the portions of the destination address to be used in comparison with the argument 64 to identify a packet that matches the requirements of the registration request, and the logical controls 68 specify logical operators to indicate whether the packet that matches the corresponding argument 64 should be included or excluded from being forwarded to the requesting client.

Each entry 54 also includes a masked address field 60 that is formed by the registration resource 50 performing the masking operation between the corresponding argument 64 and the corresponding mask 62; as described below with respect to FIGS. 5A and 5B, the masked address 60 is used to identify matches between a received packet and the corresponding rule implemented by the entry 54; hence, a router can identify a packet that needs to be forwarded to a specified destination, even if the specified destination is not within the address realm of the router 14.

The pluricast logic 52 of FIG. 2 is configured for executing the routing decisions related to pluricasting, described below with respect to FIGS. 5A and 5B.

FIG. 4 is a diagram illustrating in further detail the registration parameters supplied by a registration request 58. For example, the registration request 58a represents the registration parameters sent by the client 16c having a geodetic address "Geodetic.News.Europe.France.Paca.Nice.205", where "205" represents the local address of the client devices 16c within the address realm of the router 14g. The mask 62 (Mask1) and the argument 64 (Arg1) are used to identify news packets that are destined for the France address realm, regardless of County, City, or location. The destination parameter 66 specifies the destination for the packet in response to determining a matching packet. Hence, implementation of the registration request 58 causes any news packet destined for France (i.e., via the router 14b serving the France address realm) to also be copied to the router 14g serving the City=Nice address realm.

Hence, the registration request 58a can be implemented by the router 14g by adding the table entry 54a in its local routing table, and forwarding the registration request 58a to its parent router 14d; the parent router 14d, noting that the registration request 58a is within its address realm, also updates its local routing table with a corresponding entry 54a, and forwards the registration request 58a up to its parent router 14b.

The router 14b, in response to receiving the registration request 58a, updates its local routing table with a corresponding entry 54a. The router 14b, also in response to identifying that the mask 62 corresponds to the address realm and the aggregation level of the router 14b, determines that it is a top-level router with respect to the registration request and identifies that no further forwarding of the registration request 58a is necessary.

Hence, the pluricast logic 52 in the router 14b, in response to receiving a packet having a destination address specifying the address prefix "Geodetic.News.Europe.France" can detect the routing table entry that implements the rule by the registration request 58a ("All News Packets to France Copied to Nice") by forwarding a copy of the packet to the specified destination ("Geodetic.News.Europe.France.Paca.Nice.0") using prescribed source routing techniques, enabling the router 14g to pluricast the packet upon reception.

The registration request 58b of FIG. 4 illustrates another example in which the client device 16c sends a registration request for a packet that is not part of the local address realm. In response to receiving the registration request 58b, the routers 14g and 14d forward the packet to the parent router 14b without updating their internal routing table 46, since the argument 64 is directed to a packet outside the address realms of the routers 14g and 14d.

The registration resource 50 of the router 14b, in response to receiving the registration request 58b, generates a routing table entry 54b, and forwards the registration request 58b to the router 14e for implementation of the registration request 58b in the routers 14e and 14h. Hence, the router 14b can forward a copy of a downstream packet (i.e., received from the router 14a) and destined for the router 14h to the router 14g by implementing the rule of the registration request 58b ("All News Packets to Rennes Copied to Nice"). Moreover, the propagation of the registration request 58b to the routers 14e and 14h enable packets that are locally generated and distributed by the router 14h to be forwarded to the router 14g.

The registration request 58c illustrates a more complex registration request that utilizes more complex logical controls 68 as illustrated for entry 54b of FIG. 3. In particular, the registration request 58c is implemented in the entry 54b based on the logical control "If A AND *B then Copy", where the "*B" corresponds to the logical operator "NOT B". Hence, the logical control 68 in the entry 54b enables the router 14b to implement the rule "All News Packets to France, except Packets to Rennes, Copied to Nice".

FIG. 3 also illustrates an entry 54c used by the router 14b in pluricasting received frames that have the prescribed pluricast code ("0") contiguously following the address prefix "Geodetic.News.Europe.France" in the form "Geodetic.News.Europe.France.0". In particular, the entry 54c includes the mask 22b used by the router 14b for locating the prescribed pluricast code following the address prefix identifying the aggregated address realm for the corresponding router 14b.

Hence, each router 14 is able to pluricast and/or copy a packet to a specified destination based on applying a prescribed mask to a destination address of a packet, and determining whether the masked destination address matches a masked address in the table 46. As apparent from the foregoing, different masks may be applied to the same destination address for different rules, for example pluricasting, or sending copies to different destinations based on respective registration requests.

Figure 5A:
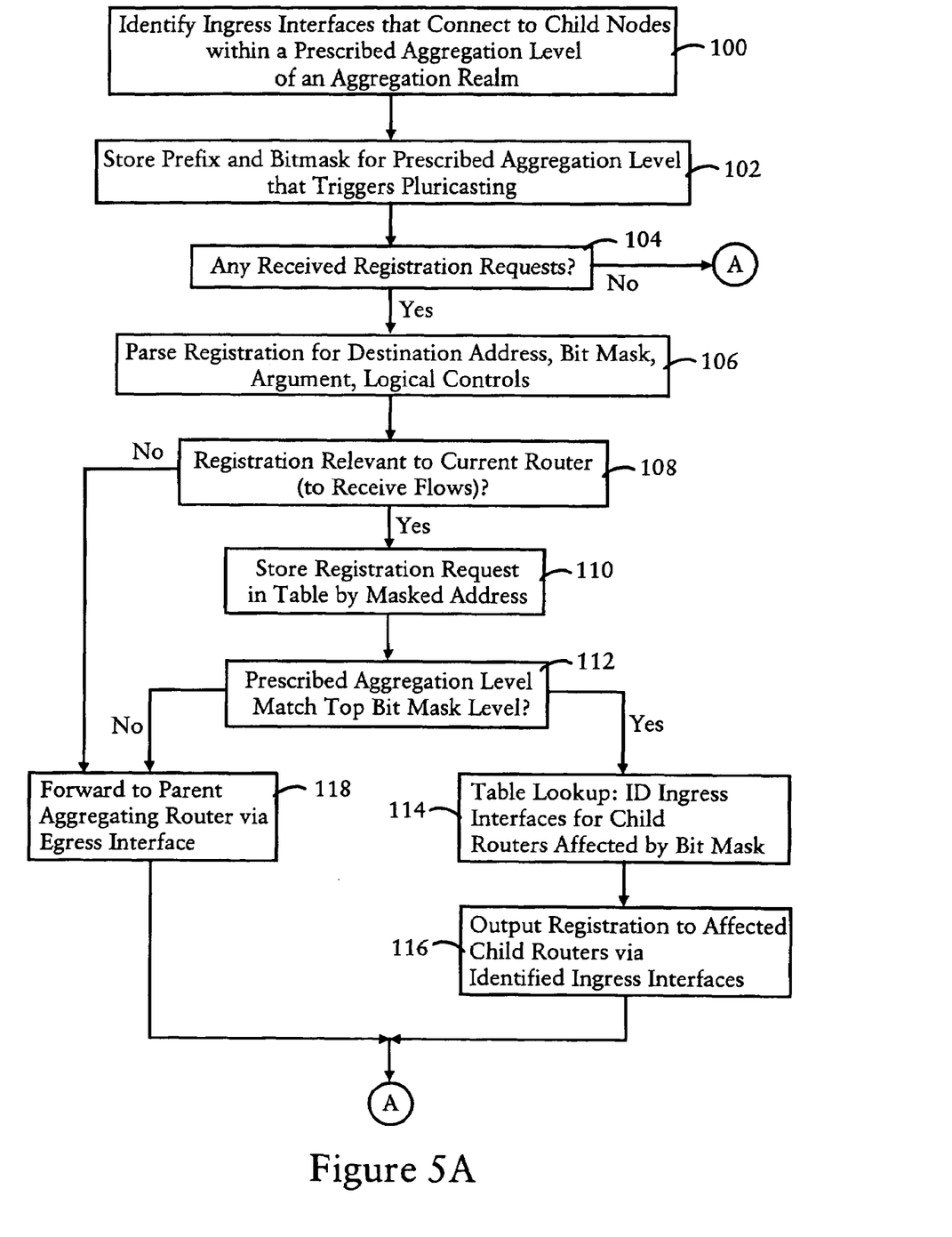
FIGS. 5A and 5B are diagrams illustrating the method of implementing rules-based pluricasting of packets, according to an embodiment of the present invention.
Figure 5B:
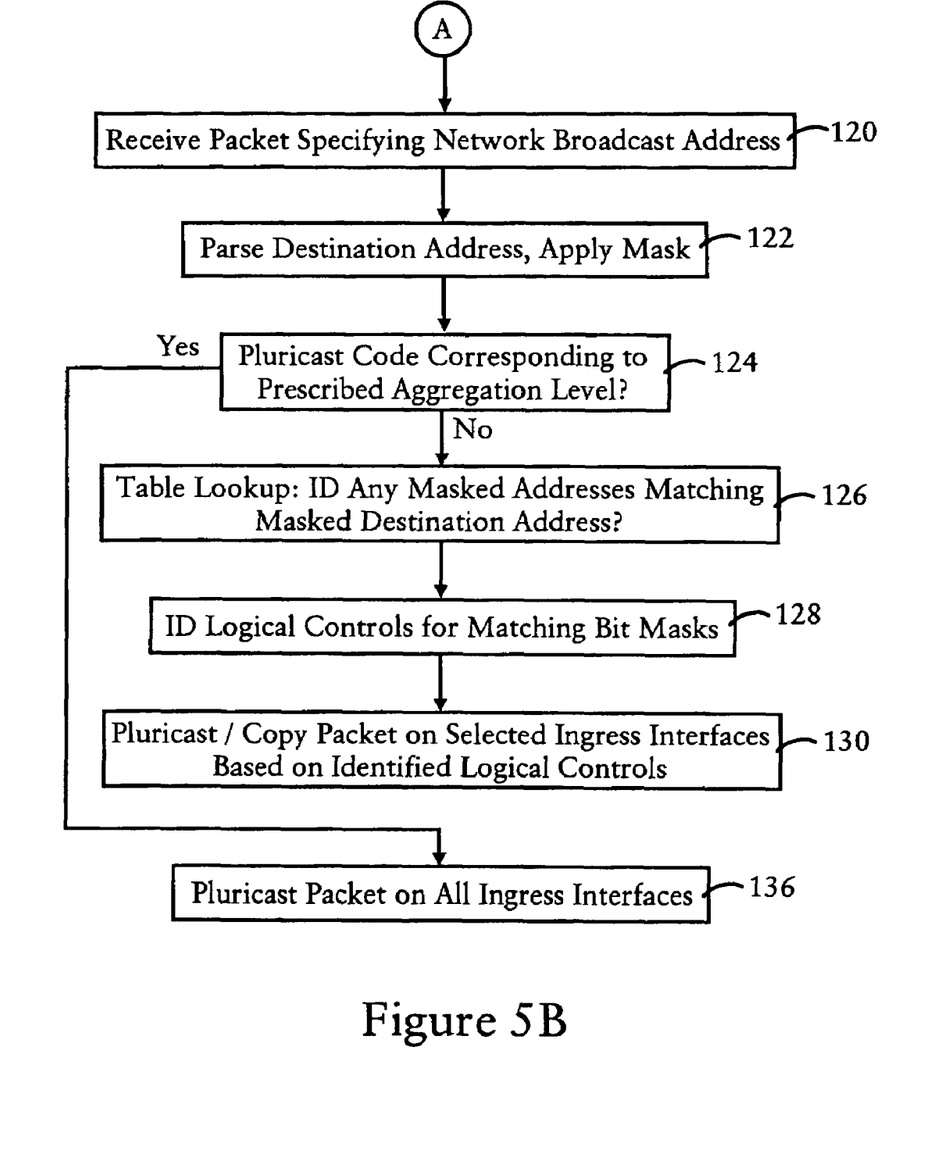

FIGS. 5A and 5B are diagrams summarizing the method of forwarding packets based on rules-based pluricasting by the routers of FIG. 1, according to an embodiment of the present invention. The steps described herein with can be implemented in each router as executable code stored on a computer readable medium (e.g., floppy disk, hard disk, EEPROM, CD-ROM, etc.), or propagated via a computer readable transmission medium (e.g., fiber optic cable, electrically-conductive transmission line medium, wireless electromagnetic medium, etc.).

The method begins in step 100, where the router advertisement resource 48 is configured for identifying ingress interfaces 42 that connect to child routers within a prescribed aggregation level of an aggregation realm. For example, the router advertisement resource 48 of the router 14b determines that the routers 14d and 14e are child nodes within the address realm of "France". The router advertisement resource 48, upon determining the relative position of the router within the network topology, stores in step 102 the address prefix and the bit mask 22 for the prescribed aggregation level 18 that triggers pluricasting within the router 14. In the case of the router 14b, the router advertisement resource 48 would store the address prefix "Geodetic.News.Europe.France" and the address mask 22b ("1.1.1.1.1.0.0") to enable subsequent identification of the pluricasting code "0" contiguously following the address prefix.

In response to receiving any registration requests 58 in step 104, the registration resource 50 parses in step 106 the registration request for the destination address 66, the bit mask 62, the argument 64, and any logical controls 68. If in step 108 the registration resource 50 determines that the registration request is relevant to the router with respect to reception of flows, the registration resource 50 stores in step 110 the registration request 58 in the routing table 46 as a table entry 54 based on the masked address 60 by masking the argument 64 with the supplied mask 62. If in step 112 the registration resource 50 determines that the prescribed aggregation level matches the top bit mask level of the bit mask 62, indicating that the router 14 is a top-level router for the registration request, the registration resource 50 identifies in step 114 any child routers that may be affected by the bit mask, and outputs in step 116 the registration request to the affected child routers via the identified ingress interfaces 42.

If in step 108 the registration request is not relevant to the current router, or if in step 112 the router is not the top-level router relative to the registration request, the registration resource 50 forwards in step 118 the registration request to the parent aggregating router via the egress interface 40. The steps described with respect to FIG. 5A are repeated in each of the routers that receive the registration request, enabling the registration request to be propagated throughout the content network 10 as needed.

FIG. 5B illustrates the processing of packets by the routers 14, according to an embodiment of the present invention. In response to receiving in step 120 a packet specifying a network broadcast address, the pluricast logic 52 parses in step 122 the destination address of the packet and applies the default mask 22 (e.g., 22b) assigned to the router (e.g., 14b). If in step 124 the pluricast code corresponding to the prescribed aggregation level is detected, a packet is pluricasted in step 136 on all ingress interfaces 42. For example, in the case of the router 14b, if the destination address ("Geodetic.News.Europe.France.0.0.0") is masked by the assigned mask 22b ("1.1.1.1.1.0.0"), the resulting masked address ("Geodetic.News.Europe.France.0.*.*") indicates the pluricast code "0" corresponding to the prescribed aggregation level 20e, causing the pluricast logic 52 in the router 14b to pluricast the packet on all the ingress ports 42 in step 136.

If the pluricast code corresponding to the prescribed aggregation level is not detected in step 124, the pluricast logic 52 performs a table lookup in step 126 by retrieving the masked addresses 60 and the respective masks 62: the pluricast logic 52 performs a comparison, for each masked address 60, to determine if masking the destination address with the corresponding mask 62 creates a masked destination address that matches the masked address 60. If in step 126 there are any matches, the corresponding logical controls for the matching entries are retrieved in step 128, and applied in step 130 for pluricasting and/or copying of the packet on selected ingress interfaces based on identified logical controls. As described above with respect to the registration request 58c in FIG. 4, a given logical control can specify that a packet is excluded from being pluricasted on an identified interface. Also note that the absence of any match in step 126 results in normal routing to the next-hop router.

Figure 6:
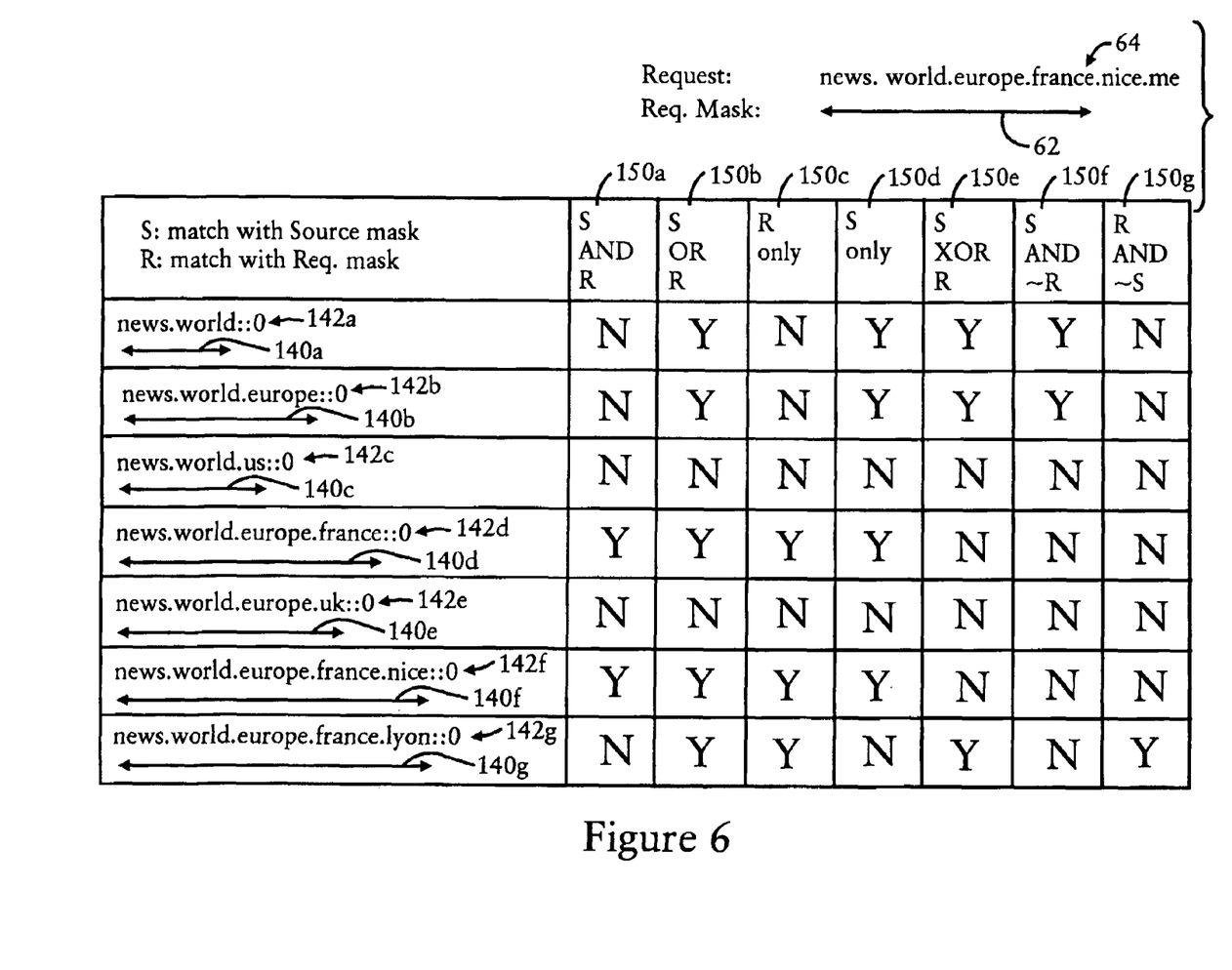
FIG. 6 is a diagram illustrating rules-based pluricasting of packets, according to an embodiment of the present invention.

FIG. 6 is a diagram illustrating in further detail examples of implementing the logical controls 68 by the routers 14, according to an embodiment of the present invention. FIG. 6 illustrates use of two different types of masks, namely the request mask 62 and a source mask (e.g., 140a). The request mask 62 is explicitly generated by a requesting entity, whereas the source mask (e.g., 140a) can be implicit (i.e., determined by the router) based on the address value of the broadcast address.

For example, assume a client (e.g., 16*d*) has a logical address "news.world.europe.france.nice.me". The client 16*d* registers by sending to the router 14*g* a request 58 that specifies the logical address 64 as an argument, and a request mask 62. The logical address 64 is the geodetic address to which a given subscriber may subscribe to (e.g., news related to Nice), also referred to herein as the "subscriber address." In other words, the address 64 does not specify a location of a client device 16*d*, but rather identifies the content to which the client is subscribing to (i.e., the address of the content that the client wishes to receive). Hence, an edge device (e.g., an edge router) serving as a final destination for receiving the content specified by the subscriber address will be configured for mapping the "subscriber address" to an identified hardware-based address (e.g., a user visiting the United States can access his/her content having been sent to the subscriber address 64).

The request mask 62 is illustrated in FIG. 6 as an arrow that encompasses the relevant aggregation levels 20: hence, the request mask 62 encompasses the prefix portion "news.world.europe.france" of the address "news.world.europe.france.nice.me", and as such is equivalent to the above-described mask format "1.1.1.1.0.0".

In contrast, broadcast addresses (e.g., 142*a*, 142*b*, etc.) have implicit source masks. For example, the broadcast address 142*a* having the value "news.world.0.0.0.0" (or "news.world::0" according to IPv6 addressing format) has an implicit source mask 140*a*: the source mask 140*a* is "implicit" with the corresponding value "1.1::0" because the pluricast logic 52 detects within the broadcast address 142*a* the prescribed pluricast pattern of all zero values following the "world" field. Based on the corresponding aggregation level (e.g., 18*b*) of the router, the pluricast logic 52 can determine whether it should respond to the prescribed pluricast pattern. In the same manner, the broadcast address 142*b* having the value "news.world.europe::0" has an implicit source mask 140*b* having a value of "1.1.1::0"; the broadcast address 142*c* having the value "news.world.us::0" has an implicit source mask 140*c* having a value of "1.1.1::0"; the broadcast address 142*d* having the value "news.world.europe.france::0" has an implicit source mask 140*d* having a value of "1.1.1.1::0"; the broadcast address 142*e* having the value "news.world.europe.uk::0" has an implicit source mask 140*e* having a value of "1.1.1.1::0"; the broadcast address 142*f* having the value "news.world.europe.france.nice::0" has an implicit source mask 140*f* having a value of "1.1.1.1.1::0"; and the broadcast address 142*g* having the value "news.world.europe.france.lyon::0" has an implicit source mask 140*g* having a value of "1.1.1.1.1::0".

FIG. 6 also illustrates that the pluricast logic can determine two logical values: Source Mask Match (S) and Request Mask Match (R). The logical value "S" is set to "1" in response to a match between the broadcast address (e.g., 142*a*) (which is implicitly masked by the corresponding source mask (e.g., 140*a*)), and the subscriber address 64 used as the argument for registering for broadcast data, when masked by the corresponding source mask (e.g., 140*a*). For example, the logical result "S only" 150*d* is set to "1" for the broadcast address 142*a* because the masking of the subscriber address 64 ("news.world.europe.france.nice.me") with the source mask 140*a* ("1.1:0") results in the masked value "news.world::0", which matches the broadcast address 142*a* ("news.world::0"). The same logical result 150*d* (S is set to "1") occurs when masking the subscriber address 64 with the masks 140*b*, 140*d*, or 140*f*, and comparing the respective masked addresses with the respective broadcast addresses 142*b*, 142*d*, and 142*f*.

In contrast, the opposite logical result for the result 150*d* (S is set to "0") occurs when masking the subscriber address 64 with the masks 140*c*, 140*e*, or 140*g*: masking the subscriber address with the mask 140*c* results in the masked value "news.world.europe" which does not match the broadcast address 142*c* "news.world.us"; similarly, masking the subscriber address with the mask 140*e* results in the masked value "news.world.europe.france" which does not match the broadcast address 142*e* "news.world.europe.uk"; and masking the subscriber address with the mask 140*g* results in the masked value "news.world.europe.france.nice" which does not match the broadcast address 142*g* "news.world.europe.lyon"

Hence, one logical rule can be implemented within a router that identifies whether the source mask (e.g., 140*f*) provides a match between the broadcast address (e.g., 142*f*) and the subscriber address 64.

The Request Mask Match (R), illustrated as the logical result 150*c*, uses the request mask 62 ("1.1.1.1.0.0") to determine a match between the subscriber address 64 and the broadcast address (e.g., 142*d*). In particular, the subscriber address 64 masked by the request mask 62 results in the masked value of "news.world.europe.france::0", which matches the masked values of the broadcast addresses 142*d*, 142*f*, and 142*g* having been masked by the request mask 62. In contrast, the masked values of the broadcast addresses 142*a*, 142*b*, 142*c*, 142*e* after having been masked by the request mask 62 are "news.world::0", "news.world.europe::0", news.world.us::0", "news.world.europe.uk", none of which match the masked subscriber address value of "news.world.europe.france::0".

Hence, a second logical rule can be implemented within a router that identifies whether the request mask 62 provides a match between the broadcast address (e.g., 142*f*) and the subscriber address 64.

Moreover, the logical combinations illustrated in the logical results 150*a*, 150*b*, 150*e*, 150*f*, and 150*g* illustrate that multiple logical combinations can be implemented. Of particular interest is the logical result 150*g* (R and Not S), where the logical operator "NOT" is represented in FIG. 6 by the symbol "~": implementation of the rule 150*g* by the router causes only packets broadcast to an alternate destination (Lyon instead of Nice) to be forwarded to the subscriber.

Hence, the pluricast logic 52 is able to implement the logical operators 68, as illustrated in FIG. 6, to provide specific control of content to desired destinations.

According to the disclosed embodiment, a registration request from a subscriber can be coalesced into multiple broadcast groups, based on performing rules-based matching and routers. Moreover, the distribution of the registration request throughout multiple routers provides on a configuration of the routers for distribution and/or exclusion of identified data flows to identify destinations, even if the identified destinations are outside the address realm of the destination specified within the broadcast packets.

Although the disclosed embodiment describes a bitwise aggregation that is similar to IP-based address aggregation, other aggregation mechanisms may apply, for example static lists, or wild-card techniques as described in commonly assigned, copending application Ser. No. 10/404,064, filed Apr. 2, 2003, entitled ARRANGEMENT IN A ROUTER FOR GENERATING A ROUTE BASED ON A PATTERN OF A RECEIVED PACKET.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a router, the method including:

storing by the router a first routing table entry that specifies an address prefix, the address prefix corresponding to an aggregation level assigned to the router relative to a tree-based network topology within an aggregation realm of a content network, the address prefix having a prescribed prefix length;

receiving by the router a packet from a parent router within the tree-based network topology of the content network via an egress interface of the router;

determining by the router whether a destination address field of the packet has a destination address that specifies a prescribed pluricasting code at a prescribed location relative to the prescribed prefix length;

selectively pluricasting the packet by the router to a plurality of destination routers within the tree-based network topology, via respective ingress interfaces, based on determining that the destination address field specifies the address prefix, and the prescribed pluricasting code at the prescribed location;

receiving a registration request specifying a first mask, an argument, and a specified destination for a node; and storing a second routing table entry that specifies the first mask, the argument, the specified destination, and a masked address based on the first mask and the argument;

the selectively pluricasting including forwarding the packet to the specified destination based on identifying a match between the masked address and a corresponding portion of the destination address;

wherein the receiving of the registration request includes receiving the registration request from a child router via one of the ingress interfaces, the method further comprising forwarding the registration request to the parent router via the egress interface.

2. The method of claim 1, wherein the determining includes generating the masked destination address by applying to the destination address the first mask configured for identifying, in the destination address, the address prefix and a prescribed number of bits contiguously following the address prefix, the prescribed location of the prescribed pluricasting code being within the prescribed number of bits.

3. The method of claim 2, wherein the selectively pluricasting includes:

determining whether a third routing table entry specifies a second masked address that matches the masked destination address, the masked address based on a second mask and a second argument specified in the second routing table entry;

retrieving from the second routing table entry a logical control and a second specified destination in response to the second masked address matching the masked destination address; and blocking the output of the packet on an identified one of the ingress interfaces serving the second specified destination in response to the logical control specifying that the packet is not to be sent to the second specified destination.

4. The method of claim 3, further comprising storing the third routing table entry in response to receiving a second registration request specifying the second mask, the second argument, the logical control, and the second specified destination, the second specified destination within an aggregation realm of the router.

5. The method of claim 1, further comprising receiving a second registration request from the parent router via the egress interface, the method further comprising forwarding the second registration request to at least one child router via a corresponding one of the ingress interfaces based on the specified destination.

6. The method of claim 1, further comprising:

receiving a second packet specifying a second destination address that does not include the prescribed pluricasting code at the prescribed location;

accessing the second routing table entry in response to detecting a match between the first mask and a corresponding portion of the second destination address; and forwarding the second packet to the corresponding specified destination of the second routing table entry based on a corresponding logical control specified in the second routing table entry.

7. The method of claim 6, wherein the specified destination of the second routing table entry is outside an aggregation realm of the router.

8. A router comprising:

a routing table configured for storing a first routing table entry specifying an address prefix, the address prefix corresponding to an aggregation level assigned to the router relative to a tree-based network topology within an aggregation realm of a content network, the address prefix having a prescribed prefix length;

an egress interface configured for receiving a packet from a parent router within the tree-based network topology;

a routing resource configured for determining whether a destination address field of the packet has a destination address that specifies a prescribed pluricasting code at a prescribed location relative to the prescribed prefix length, the routing resource configured for selectively pluricasting the packet to destination routers within the tree-based network topology based on determining that the destination address field specifies the address prefix, and the prescribed pluricasting code at the prescribed location; and a plurality of ingress interfaces configured for supplying to the respective destination routers the packet having been pluricast by the routing resource;

wherein the routing resource is configured for:

receiving a registration request specifying a first mask, an argument, and a specified destination for a node;

storing a second routing table entry that specifies the first mask, the argument, the specified destination, and a masked address based on the first mask and the argument;

forwarding the packet to the specified destination based on identifying a match between the masked address and a corresponding portion of the destination address;

forwarding the registration request to the parent router via the egress interface in response to receiving the registration request from a child router via one of the ingress interfaces.

9. The router of claim 8, wherein the routing resource is configured for generating the masked destination address by applying to the destination address the first mask configured for identifying, in the destination address, the address prefix and a prescribed number of bits contiguously following the address prefix, the prescribed location of the prescribed pluricasting code being within the prescribed number of bits.

10. The router of claim 9, wherein the routing resource is configured for:
   determining whether a third routing table entry specifies a second masked address that matches the masked destination address, the masked address based on a second mask and a second argument specified in the second routing table entry;
   retrieving from the second routing table entry a logical control and a second specified destination in response to the second masked address matching the masked destination address; and
   blocking the output of the packet on an identified one of the ingress interfaces serving the second specified destination in response to the logical control specifying that the packet is not to be sent to the second specified destination.

11. The router of claim 10, wherein the routing resource is configured for storing the third routing table entry in response to receiving a second registration request specifying the second mask, the second argument, the logical control, and the second specified destination, the second specified destination within an aggregation realm of the router.

12. The router of claim 8, wherein the routing resource, in response to receiving a second registration request from the parent router via the egress interface, is configured for forwarding the second registration request to at least one child router via a corresponding one of the ingress interfaces based on the specified destination.

13. The router of claim 8, wherein the routing resource is configured for:
   receiving a second packet specifying a second destination address that does not include the prescribed pluricasting code at the prescribed location;
   accessing the second routing table entry in response to detecting a match between the first mask and a corresponding portion of the second destination address; and
   forwarding the second packet to the corresponding specified destination of the second routing table entry based on a corresponding logical control specified in the second routing table entry.

14. The router of claim 13, wherein the specified destination of the second routing table entry is outside an aggregation realm of the router.

15. A computer readable storage medium having stored thereon sequences of instructions for forwarding a received packet by a router, the sequences of instructions including instructions for:
   storing by the router a first routing table entry that specifies an address prefix, the address prefix corresponding to an aggregation level assigned to the router relative to a tree-based network topology within an aggregation realm of a content network, the address prefix having a prescribed prefix length;
   receiving by the router a packet from a parent router within the tree-based network topology of the content network via an egress interface of the router;
   determining by the router whether a destination address field of the packet has a destination address that specifies a prescribed pluricasting code at a prescribed location relative to the prescribed prefix length;
   selectively pluricasting the packet by the router to a plurality of destination routers within the tree-based network topology, via respective ingress interfaces, based on determining that the destination address field specifies the address prefix, and the prescribed pluricasting code at the prescribed location;
   receiving a registration request specifying a first mask, an argument, and a specified destination for a node; and
   storing a second routing table entry that specifies the first mask, the argument, the specified destination, and a masked address based on the first mask and the argument;
   the selectively pluricasting including forwarding the packet to the specified destination based on identifying a match between the masked address and a corresponding portion of the destination address;
   wherein the receiving of the registration request includes receiving the registration request from a child router via one of the ingress interfaces, the medium further comprising instructions for forwarding the registration request to the parent router via the egress interface.

16. The medium of claim 15, wherein the determining includes generating the masked destination address by applying to the destination address the first mask configured for identifying, in the destination address, the address prefix and a prescribed number of bits contiguously following the address prefix, the prescribed location of the prescribed pluricasting code being within the prescribed number of bits.

17. The medium of claim 16, wherein the selectively pluricasting includes:
   determining whether a third routing table entry specifies a second masked address that matches the masked destination address, the masked address based on a second mask and a second argument specified in the second routing table entry;
   retrieving from the second routing table entry a logical control and a second specified destination in response to the second masked address matching the masked destination address; and
   blocking the output of the packet on an identified one of the ingress interfaces serving the specified destination in response to the logical control specifying that the packet is not to be sent to the second specified destination.

18. The medium of claim 17, further comprising instructions for storing the third routing table entry in response to receiving a second registration request specifying the second mask, the second argument, the logical control, and the second specified destination, the second specified destination within an aggregation realm of the router.

19. The medium of claim 15, further comprising receiving a second registration request from the parent router via the egress interface, the medium further comprising instructions for forwarding the second registration request to at least one child router via a corresponding one of the ingress interfaces based on the specified destination.

20. The medium of claim 15, further comprising instructions for:
   receiving a second packet specifying a second destination address that does not include the prescribed pluricasting code at the prescribed location;
   accessing the second routing table entry in response to detecting a match between the first mask and a corresponding portion of the second destination address; and
   forwarding the second packet to the corresponding specified destination of the second routing table entry based on a corresponding logical control specified in the second routing table entry.

21. The medium of claim 20, wherein the specified destination of the second routing table entry is outside an aggregation realm of the router.

22. A router comprising:
   means for storing a first routing table entry that specifies an address prefix, the address prefix corresponding to an aggregation level assigned to the router relative to a tree-based network topology within an aggregation realm of a content network, the address prefix having a prescribed prefix length;

an egress interface configured for receiving a packet from a parent router within the tree-based network topology;

means for determining whether a destination address field of the packet has a destination address that specifies a prescribed pluricasting code at a prescribed location relative to the prescribed prefix length, the determining means configured for selectively pluricasting the packet to a plurality of destination routers within the tree-based network topology based on determining that the destination address field specifies the address prefix, and the prescribed pluricasting code at the prescribed location; and a plurality of ingress interfaces configured for supplying to the respective destination routers the packet having been pluricast by the means for determining;

the means for storing configured for receiving a registration request specifying a first mask, an argument, and a specified destination for a node, and storing a second routing table entry that specifies the first mask, the argument, the specified destination, and a masked address based on the first mask and the argument;

the determining means configured for forwarding the packet to the specified destination based on identifying a match between the masked address and a corresponding portion of the destination address;

wherein the registration request is received from a child router via one of the ingress interfaces, the means for storing configured for forwarding the registration request to the parent router.

23. The router of claim 22, wherein the determining means is configured for generating the masked destination address by applying to the destination address the first mask configured for identifying, in the destination address, the address prefix and a prescribed number of bits contiguously following the address prefix, the prescribed location of the prescribed pluricasting code being within the prescribed number of bits.

24. The router of claim 23, wherein the determining means is configured for:

determining whether a third routing table entry specifies a second masked address that matches the masked destination address, the masked address based on a second mask and a second argument specified in the second routing table entry;

retrieving from the second routing table entry a logical control and a second specified destination in response to the second masked address matching the masked destination address; and blocking the output of the packet on an identified one of the ingress interfaces serving the second specified destination in response to the logical control specifying that the packet is not to be sent to the second specified destination.

25. The router of claim 24, wherein the means for storing is configured for storing the third routing table entry in response to receiving a second registration request specifying the second mask, the second argument, the logical control, and the second specified destination, the second specified destination within an aggregation realm of the router.

26. The router of claim 22, wherein a second registration request is received from the parent router, the means for storing configured for forwarding the second registration request to at least one child router via a corresponding one of the ingress interfaces based on the specified destination.

27. The router of claim 22, wherein:

the egress interface is configured for receiving a second packet specifying a second destination address that does not include the prescribed pluricasting code at the prescribed location;

the determining means configured for accessing the second routing table entry in response to detecting a match between the first mask and a corresponding portion of the second destination address, the determining means configured for forwarding the second packet to the corresponding specified destination of the second routing table entry based on a corresponding logical control specified in the second routing table entry.

28. The router of claim 27, wherein the specified destination of the second routing table entry is outside an aggregation realm of the router.

* * * * *